Patented Nov. 6, 1951

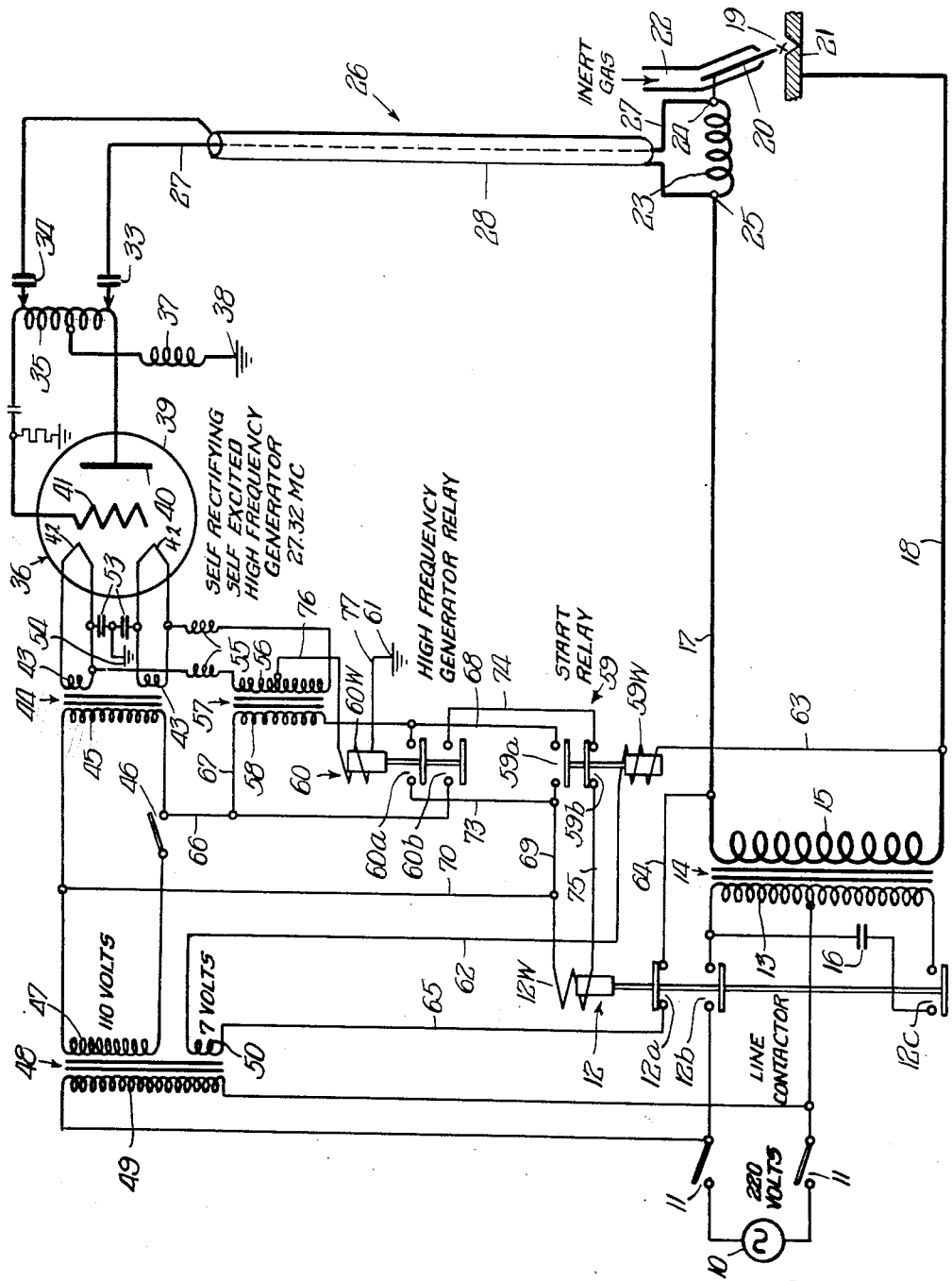

2,573,901

UNITED STATES PATENT OFFICE 2,573,901

ARC WELDING SYSTEM

Dean C. Girard, San Leandro, and Frank T. Roach, Hayward, Calif., assignors, by mesne assignments, to National Cylinder Gas Company, a corporation of Delaware Continuation of application Serial No. 67,795, December 29, 1948. This application March 7, 1950, Serial No. 148,162

12 Claims. (Cl. 171—97)

1

This invention relates, generally, to arc welding systems, and it has particular relation to gas shielded arc welding in which the arc is stabilized by superimposed high frequency. This application is a continuation of application Serial No. 67,795, filed December 29, 1948, now abandoned.

Among the objects of this invention are: To generate the high frequency arc stabilizing current only while the welding operation is being performed; to initiate the operation of the high frequency generator by short circuiting the welding circuit on a relatively low voltage source; and to maintain the flow of welding current only while the high frequency arc stabilizing current is being generated.

Other objects of this invention will, in part, be obvious and in part appear hereinafter.

This invention is disclosed in the embodiment thereof shown in the accompanying drawing, and it comprises the features of construction, combination of elements, circuit connections, and arrangement of parts which will be exemplified in the description hereinafter set forth and the scope of the application of which will be indicated in the appended claims.

For a more complete understanding of the nature and scope of this invention, reference may be had to the following detailed description, taken together with the accompanying drawing in which the single figure illustrates diagrammatically the circuit connections which may be employed in practicing this invention.

Referring now particularly to the drawing, it will be observed that the reference character 10 designates a source of alternating current, such as a 220 volt 60 cycle source. It will be understood that other voltages and frequencies can be employed, the particular values specified being for illustrative purposes only. The source 10 may be connected by line switches 11 and a line contactor, shown generally at 12, to energize a primary winding 13 of a welding transformer that is shown, generally, at 14. The welding transformer 14 includes a secondary winding 15 whose open circuit voltage may be of the order of eighty to ninety volts. The line contactor 12 includes an operating winding 12w, normally closed contacts 12a whose function will be described hereinafter, and normally open contacts 12b and 12c. It will be observed that the contacts 12b, when closed, serve to connect the primary winding 13 for energization to the source 10 when the switches 11 are closed. Contacts 12c are provided to connect a capacitor 16 across the primary winding 13 for power factor correction.

2

The secondary winding 15 of the welding transformer 14 may be connected by conductors 17 and 18 to supply current for maintaining a welding arc 19 between an electrode 20, which may be of the non-consumable type, and work 21 on which the welding operation is to be performed. An inert gas, such as argon, may be supplied through a conduit 22 around the electrode 20 and the arc 19 in accordance with conventional shielded arc welding practice.

Since the welding arc 19 is supplied from the secondary winding 15 of the welding transformer 14 with relatively low frequency alternating current, difficulty is encountered in striking and maintaining the arc. The tungsten electrode 20 should not touch the work 21 except to a very minor extent for it will be contaminated and interfere with proper operation. In order to assist in striking and maintaining the arc, provision is made for superimposing on it a current of a relatively high frequency. For this purpose frequencies in the band from 27.16 to 27.48 megacycles have been set aside tentatively. A frequency of 27.32 megacycles has been chosen from this permissible band of frequencies for stabilizing the operation of the arc 19.

The stabilizing high frequency is supplied to the arc 19 in close proximity thereto. For this purpose an inductor 23 is connected between the welding electrode 20 and the conductor 17, as shown. The inductor 23 has terminals 24 and 25. It will be noted that the terminal 24 is immediately adjacent the electrode 20 while the terminal 25 provides for connection to the welding lead or conductor 17.

The stabilizing high frequency is applied across the inductor 23 by means of a co-axial cable that is shown, generally, at 26. It will be noted that the inner conductor 27 of the co-axial cable 26 is connected to the terminal 24 of the inductor 23 which is adjacent the electrode 20 and the arc 19. The outer conductor 28 of the co-axial cable 26 is connected to the other terminal 25 of the inductor 23. It will be understood that the length of the co-axial cable 26 is chosen with respect to the wave length of the stabilizing frequency employed so that the high frequency current is transmitted therethrough with a minimum of loss and a maximum of efficiency. Overheating of the co-axial cable 23 is avoided. At the same time sufficient power is available across the inductor 23 to provide the desired stabilizing effect on the arc 19.

The conductors 27 and 28 which comprise the co-axial cable 26 may be connected through capacitors 33 and 34 to an inductor 35. As illustrated, the connections between the capacitors 33 and 34 and the inductor 35 are variable in order to permit adjustment of the tuning as may be required. The inductor 35 forms a part of a self-rectifying self-excited high frequency generator which is indicated, generally, at 36. The inductor 35 has a center tap, as shown, which is connected through a radio frequency choke coil 37 to ground at 38.

The generator 36 includes a double triode electric valve 39 which is of known design and construction. Type 304TL has been found satisfactory for the purposes of the generator 36. It will be understood, however, that two separate single triode valves can be employed, if desired, in lieu of the double triode electric valve 39 illustrated.

The valve 39 includes an anode or plate 40 and a control grid 41, these being connected, as shown, to the ends of the inductor 35. The valve 39 also includes a pair of hot cathodes 42 which may be heated by secondary windings 43 of a filament transformer, shown generally, at 44, which has a primary winding 45.

Any suitable means can be provided for energizing the primary winding 45. As shown, a switch 46 is employed for connecting the primary winding 45 for energization across a secondary winding 47, operating at 110 volts, which forms a part of a transformer, shown generally at 48. The transformer 48 has a primary winding 49 which may be connected for energization across the source 10 when the switches 11 are closed. In addition the transformer 48 has a low voltage secondary winding 50 arranged, as indicated, to operate at about seven volts, and used for a purpose to be described presently.

Capacitors 53 serve to interconnect the hot cathodes 42 and their mid point is connected to ground at 54 in accordance with conventional practice.

As indicated, the generator 36 is of the self-rectifying type. In order to accomplish this radio frequency choke coils 55 interconnect the circuits to the hot cathodes 42 with a secondary winding 56 of a plate transformer that is indicated, generally, at 57. A primary winding 58 forms another part of the transformer 57 and it is arranged to be connected in a manner to be described presently for energization across the secondary winding 47 of the transformer 48.

It is desirable that the high frequency generator 36 function only during the time that the arc 19 is maintained between the electrode 20 and the work 21. This reduces the likelihood of radio interference since there is none when the generator 36 is not functioning and emission is at a minimum when the arc 19 is being maintained. In order to initiate the generator 36 in operation when it is desired to strike the arc 19 a start relay, shown generally at 59, is provided. The start relay 59 includes an operating winding 59w, normally open contacts 59a and normally closed contacts 59b.

A response to the operation of the high frequency generator 36 may be provided by a high frequency generator relay that is shown, generally, at 60. The relay 60 has an operating winding 60w and normally open contacts 60a and 60b. As shown, the operating winding 60w is connected between a mid point of the secondary winding 56 and ground 61.

In describing the functioning of the system shown in the drawing, it will be assumed that inert gas is being supplied through the conduit 22 and that the necessary coolant is being circulated through the inductor 23. Also it will be assumed that the switches 11 and 46 have been closed and that the line contactor 12 and relays 59 and 60 are in the deenergized or dropped positions shown in the drawing. The impedance of secondary winding 15 is high enough to prevent energization of the winding 59w therethrough. The operator momentarily touches the electrode 20 on the work 21.

As soon as the electrode 20 engages the work 21 a circuit is completed for energizing the operating winding 59w of the start relay 59. This circuit may be traced from the low voltage secondary winding 50 of the transformer 48, through conductor 62, operating winding 59w, conductor 63, conductor 18, work 21, electrode 20, inductor 23, conductor 17, conductor 64, normally closed contacts 12a and conductor 65 to the other side of the low voltage secondary winding 50. It will be apparent that the operator has to contend here with only a relatively low voltage, for example a voltage of the order of seven volts, which, as far as he is concerned, is entirely harmless.

As soon as the operating winding 59w of the start relay 59 is energized in the manner just described, the circuit to the operating winding 12w of the line contactor 12 is opened at contacts 59b and at contacts 59a a circuit is completed for energizing the primary winding 58 of the plate transformer 57. This circuit may be traced from one terminal of the secondary winding 47 of the transformer 48 through conductors 66 and 67, primary winding 58, conductor 68, contacts 59a and conductors 69 and 70 to the other side of the secondary winding 47. Plate potential now is applied to the valve 39 and sufficient current flows through the operating winding 60w of the generator relay 60 to close its contacts 60a and 60b.

Nothing further happens until the operator withdraws the electrode 20 from the work 21 while maintaining it close thereto so that the arc 19 now provided solely by the high frequency current will continue. However, the previously traced circuit for energizing the operating winding 59w of the start relay 59 is opened and this relay drops. Although contacts 59a are opened by the dropping of start relay 59, the circuit for energizing the primary winding 58 of the plate transformer 57 is maintained through contacts 60a of the generator relay 60. It will be observed that the contacts 59a are connected in parallel with the contacts 60a by conductors 68 and 73.

The dropping of the start relay 59 completes a circuit at 59b for energizing the operating winding 12w of the line contactor 12. This circuit may be traced from one side of the secondary winding 47 of the transformer 48 through conductor 66, contacts 60b, conductor 74, contacts 59b, conductor 75, operating winding 12w and conductor 70 to the other side of the secondary winding 47.

The line contactor 12 now picks up and at contacts 12b and 12c closes the circuits for energizing the primary winding 13 of the welding transformer 14 and connecting the capacitor 16 thereacross. Welding current now is induced in the secondary winding 15 of the welding transformer 14 and it flows through the conductors or welding leads 17 and 18 and the inductor 23 to provide the required current for the arc 19 which now is being stabilized by the superimposed high frequency from the generator 36.

Since contacts 12a are opened when the line contactor 12 is in the operated position, no current can flow through the operating winding 59w of the start relay 59. It will be noted that the winding 60w of the generator relay 60 is connected by a conductor 76 to the mid point of the secondary winding 56 and by a conductor 77 to ground 61.

The welding operation ceases when the operator moves the electrode 20 sufficiently far from the work 21 so that the arc cannot be sustained. This action then unloads the generator 36 to a sufficient extent so that the current flow through the plate circuit is reduced and, as a result, winding 60w of the generator relay 60 is deenergized sufficiently to permit its contacts 60a and 60b to be opened. The previously traced circuit for energizing the primary winding 58 of the plate transformer 57 through contacts 60a is opened and it is deenergized. At contacts 60b the energizing circuit for the operating winding 12w of the line contactor 12 is opened and it drops. The ssytem now is restored to the initially assumed position and, on resumption of welding operations, the cycle just described is repeated.

Since certain changes can be made in the foregoing construction and different embodiments of the invention can be made without departing from the spirit and scope thereof, it is intended that all matter shown in the accompanying drawing and described hereinbefore shall be interpreted as illustrative and not in a limiting sense.

What is claimed as new is:

1. A system for controlling the energization of an intermittently loaded power circuit comprising, in combination, a line contactor for connecting the power circuit for energization to a current source, a start relay, circuit means connecting said start relay to be energized on application of predetermined load to said power circuit when said line contactor is open, a high frequency generator connected to superimpose high frequency on said power circuit and to be initiated in operation by closing of said start relay, a generator relay, and circuit means connecting said generator relay to be energized on operation of said generator, said generator relay being arranged to maintain the said generator in operation and to effect the closure of said line contactor after said start relay drops.

2. The invention, as set forth in claim 1, wherein the high frequency generator is of the electric valve type and the generator relay is responsive to flow of unidirectional current therethrough.

3. The invention, as set forth in claim 1, wherein the voltage of the current source for energizing the start relay is substantially lower than the normal open circuit voltage of the load circuit.

4. A system for controlling the energization of an intermittently loaded power circuit comprising, in combination; a line contactor having an operating winding, normally open contacts for connecting said power circuit to a current source, and normally closed contacts; a start relay having an operating winding connected in series with said power circuit through said normally closed contactor contacts to a current source and energized on application of predetermined load to said power circuit, a set of normally closed contacts, and a set of normally open contacts; a high frequency generator connected to superimpose high frequency on said power circuit; a generator relay having a winding responsive to the operation of said generator and two sets of normally open contacts; circuit means connected through said normally open contacts of said start relay on closure thereof to initiate the operation of said generator and thereby effect the energization of said generator relay winding and closure of its contacts, circuit means connecting one set of generator relay contacts in parallel with said normally open start relay contacts to maintain said generator in operation when said start relay drops, and circuit means connecting said contactor winding for energization to a current source through said normally closed start relay contacts and the other set of generator relay contacts whereby on removal of the load from said power circuit said start relay drops and said normally open line contactor contacts are closed.

5. The invention, as set forth in claim 4, wherein the high frequency generator is of the self rectifying self-excited electric valve type and the generator relay is responsive to flow of unidirectional current therethrough.

6. The invention, as set forth in claim 4, wherein the voltage of the current source for energizing the start relay winding is substantially lower than the normal open circuit voltage of the load circuit.

7. A system for controlling the energization of an intermittently loaded power circuit comprising, in combination, a line contactor for connecting the power circuit for energization to a current source and having normally closed contacts, a first relay, circuit means connecting said first relay to be energized through said normally closed contacts on application of predetermined load to said power circuit, said first relay having normally closed and normally open contacts, a second relay, and circuit means connecting said second relay to be energized as a result of the closure of said normally open contacts of said first relay on energization thereof, said second relay having two sets of normally open contacts, one of said two sets of normally open contacts being connected in parallel with said normally open contacts of said first relay for maintaining said second relay energized and the other of said two sets of normally open contacts being connected in series with said normally closed contacts of said first relay for energizing said line contactor on removal of said predetermined load from said power circuit.

8. A system for controlling the energization of an intermittently loaded power circuit comprising, in combination, a line contactor for connecting the power circuit for energization to a current source, a first relay, circuit means connecting said first relay to be energized on application of predetermined load to said power circuit when said line contactor is open, a second relay, and circuit means connecting said second relay to be energized as a result of the energization of said first relay and arranged on removal of said predetermined load from said power circuit and deenergization of said first relay to energize said line contactor.

9. A system for controlling the energization of an intermittently loaded power circuit comprising, in combination, a line contactor for connecting the power circuit for energization to a current source, a first relay, circuit means connecting said first relay to be energized in series with said power circuit on application of predetermined load thereto when said line contactor is open, a second relay, and circuit means connecting said second relay to be energized as a result of the energization of said first relay and arranged on removal of said predetermined load from said power circuit and deenergization of said first relay to energize said line contactor.

10. A system for controlling the energization of an intermittently loaded power circuit comprising, in combination, a line contactor for connecting the power circuit for energization to a current source, a first relay, circuit means connecting said first relay to be energized from a separate current source on application of predetermined load to said power circuit when said line contactor is open, a second relay, and circuit means connecting said second relay to be energized as a result of energization of said first relay and arranged on removal of said predetermined load from said power circuit and deenergization of said first relay to energize said line contactor.

11. A system for controlling the energization of an intermittently loaded power circuit comprising, in combination, a transformer having a primary winding for energization from a source of alternating current and a secondary winding for connection to said power circuit, a line contactor for connecting said primary winding for energization to said source of alternating current, a first relay, circuit means connecting said first relay to be energized in series with said power circuit when it is short circuited and said line contactor is open, a second relay, and circuit means connecting said second relay to be energized as a result of the energization of said first relay and arranged on removal of the short circuit and deenergization of said first relay to energize said line contactor.

12. A system for controlling the energization of an intermittently loaded power circuit comprising, in combination, a transformer having a primary winding for energization from a source of alternating current and a secondary winding for connection to said power circuit, a line contactor for connecting said primary winding for energization to said source of alternating current, a first relay, circuit means connecting said first relay to be energized from a separate current source in series with said power circuit when it is short circuited and said line contactor is open, a second relay, and circuit means connecting said second relay to be energized as a result of the energization of said first relay and arranged on removal of the short circuit and deenergization of said first relay to energize said line contactor.

DEAN C. GIRARD.
FRANK T. ROACH.

No references cited.